United States Patent [19]

Schad

[11] Patent Number: 4,645,190

[45] Date of Patent: Feb. 24, 1987

[54] RUBBER-METAL MOUNT

[75] Inventor: Kurt Schad, Bischofsheim, Fed. Rep. of Germany

[73] Assignee: General Motors Corporation, Detroit, Mich.

[21] Appl. No.: 771,776

[22] Filed: Sep. 3, 1985

[30] Foreign Application Priority Data

Sep. 6, 1984 [DE] Fed. Rep. of Germany ....... 3432768

[51] Int. Cl.⁴ .............................................. F16F 3/08
[52] U.S. Cl. .................................. 267/141; 248/634; 267/140.3
[58] Field of Search ................. 267/63 R, 63 A, 8 R, 267/35, 136, 140.1, 140.3–140.5, 141, 141.1–141.7; 180/300; 248/634, 635, 638, 659; 16/2, 108

[56] References Cited

U.S. PATENT DOCUMENTS

| 2,425,566 | 8/1947 | Robinson | 267/140.3 |
| 2,430,709 | 11/1947 | Devorss | 267/140.3 |
| 2,539,431 | 1/1951 | Johnson | 267/141.1 |
| 2,571,281 | 10/1951 | Neher | 267/153 X |
| 2,987,291 | 6/1961 | Dyson | 267/140.3 |
| 3,245,646 | 4/1966 | Baratoff | 267/141 X |
| 4,576,366 | 3/1986 | Gallas et al. | 267/8 R |

FOREIGN PATENT DOCUMENTS 1367355 9/1974 United Kingdom ............ 267/140.5

Primary Examiner—Duane A. Reger
Attorney, Agent, or Firm—R. L. Phillips

[57] ABSTRACT

A rubber metal mount for absorbing forces acting substantially in the direction of an axial center line is provided with an end portion in the form of a metal plate on which is arranged a fastening element for the rubber-metal mount in the form of a threaded stud that is displaceable relative to the axial center line without causing any significant distortion or preloading in the rubber-metal mount.

1 Claim, 1 Drawing Figure

U.S. Patent   Feb. 24, 1987   4,645,190
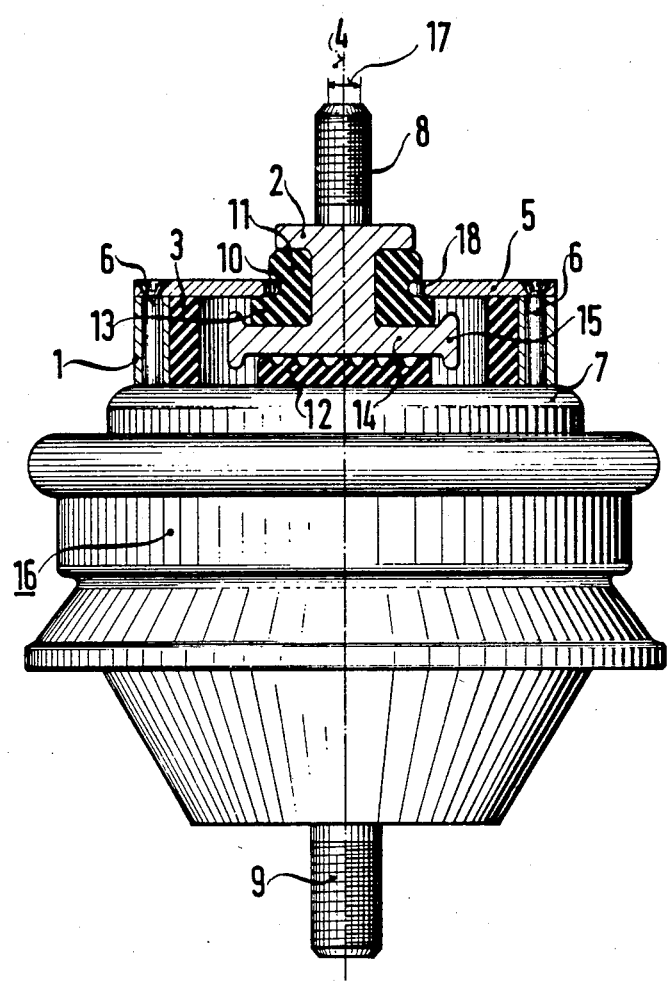

RUBBER-METAL MOUNT

TECHNICAL FIELD

The invention relates to a rubber-metal mount for absorbing forces which are acting essentially in the direction of an axial center line, including an end portion, especially in the form of a metal plate, on which is disposed a fastening element which is, preferably, in the form of a threaded stud.

BACKGROUND OF THE INVENTION

Rubber-metal mounts of this type have been disclosed in German Offenlegungsschrift DE-OS No. 23 28 566 (see especially FIGS. 1A and 1B of that patent), and means are already proposed therein whereby rubber-metal mounts of this type are modified in such a manner that in one direction i.e., in the direction of the axial center line, the mounts are relatively stiff, whereas in the other direction, i.e., transversely thereof, they are relatively soft. This problem is particularly significant in conjunction with the suspension, on at least three points, of internal combustion engines in motor vehicles. Since there will occur variances during the actual production from the theoretical design, it is difficult to prevent, even with a three-point engine suspension, the rubber-metal mounts from being subjected to preloading. This is because the suspension point locations on the body, due to production inaccuracies, do not always correspond exactly with those on the engine to ensure proper alignment. In a three-point suspension of this type, two of the suspension points can be readily equipped with rubber-metal mounts, as long as the third suspension point is not being used, because two points can always be connected by a straight line. However, if a rubber-metal mount is used on the third suspension point, one will encounter the distortion problem outlined in the foregoing. One must realize that a distorted or twisted rubber-metal mount cannot provide the type of acoustic damping for which it was originally designed and, as a result, the interior noise level, i.e., the acoustic comfort inside the vehicle, may be adversely affected. In an effort to render the rubber-metal mount of the third suspension point relatively soft with respect to its axial center line of mounting, it is proposed in the above-mentioned German DE-OS No. 23 28 566 that a recess be provided in the rubber member, so that there is some play between the metal fastening elements of the rubber-metal mount that will allow relative displacement. However, this arrangement is still afflicted with the disadvantage that the rubber-metal mount is subjected to preloading so that the problem identified above is not eliminated.

In the German Offenlegungsschrift DE-OS No. 23 13 431 it is proposed that the rubber member be reinforced in the direction of its axial center line by metal rings which are embedded in the rubber member and which extend transversely of the axial center line. However, even in this arrangement the rubber-metal mount will be subject to distortion when the fastening element of the rubber-metal mount is displaced from its axial center line. So this proposal, too, cannot be considered a satisfactory solution.

SUMMARY OF THE PRESENT INVENTION

It is the object of the present invention to provide a rubber-metal mount of the type described in the foregoing which is able, without being subject to any significant preloading, to absorb forces that would otherwise cause it to be displaced from the axial center line of its fastening element.

This object is achieved by the fastening element on the end portion being made displaceable from the axial center line without causing, to any substantial degree, distortion of the rubber-metal mount. The wording "without any substantial distortion" means within the context of this invention that at least 50% of the original forces which, in accordance with the state of the art, would act on the rubber-metal mount, and more particularly, at least 80% of these forces, will not occur any more in the rubber-metal mount according to the invention. The fastening element for the subject rubber-metal mount is intended to be laterally displaceable in all directions from the axial center line by a distance of, for instance, up to 4 mm in a plane oriented perpendicular to the axial center line, and to be tiltable from the axial center line by an angle of, for instance, up to 30° without causing any substantial load, as defined in the foregoing, to occur on the rubber member.

For accomplishing this, there is provided above the end portion, and oriented substantially transversely to the axial center line thereof, a cover with an opening therein within which the fastening element of the rubber-metal mount is displaceable together with a flange that extends above the opening and is interposed between the cover and the end portion. The opening of the cover is wider than the peripheral contour of the fastening element so that the latter is movable and displaceable therein.

However, without any further modification, a structure of this type would be subject to rattle and frictional noise as well as to premature wear. Therefore, the invention also proposes that there be disposed between the rubber-metal mount fastening element and the opening in the cover a rubber grommet having a guide plate which is arranged between the cover and the flange, and between the flange and the end portion a thrust plate which is made of rubber. This arrangement ensures that the flange and the rubber-metal mount fastening element will engage the cover, i.e., the edge of its opening, only by way of an interposed rubber member, whereby the disadvantages identified above are eliminated.

A preferable arrangement of the structure described above is one wherein the flange is provided with a peripheral bead that surrounds the thrust plate, and wherein the flange is spaced apart from the end portion by the thrust plate. This enables the flange to tilt over the peripheral edge of the thrust plate, while the latter is being encircled by the peripheral bead of the flange and is prevented from escaping from underneath the flange. The thrust plate absorbs the compressive forces that are exerted by the rubber-metal mount fastening element and transmitted through the flange onto the end portion of the rubber-metal mount, while in the arrangement described above, the guide plate of the rubber grommet between the cover and the flange absorbs the traction forces acting on the flange through the fastening element.

One exemplary embodiment will now be described in conjunction with the accompanying drawing.

Numeral 16 denotes a conventional rubber-metal mount which has a threaded stud 9 rigidly connected to its one end, and wherein an end portion 7 in the form of a rigid metal plate is disposed at its other end. Between this end portion 7 and the threaded stud 9 there is arranged one or more rubber members of the conventional type (not visible in the drawing). In examining the drawing, one must visualize the engine mount 16 as a body which is dynamically balanced about the axial center line 4. The other threaded stud 8, which serves as a fastening element for the metal-rubber mount 16, is aligned, when in its position of rest or center position, with the threaded stud 9 through the axial center line 4. An annular sleeve 1 is positioned on top of the end portion 7 and the cover 5 with the opening 18 is fitted onto this sleeve 1. The cover 5 is retained on the sleeve 1 by means of screws 6. The screws 6, which also serve as fastening elements for the sleeve 1 itself, are threadedly connected (not visible in the drawing) to the end portion 7.

The arrangement according to the invention is illustrated in cross section in the drawing. The cover 5 as well as the sleeve 1 are provided with through bores for the screws 6. The threaded stud 8, which serves as a fastening element for the rubber-metal mount 16, extends through the opening 18 of the cover 5 and is fixed to a flange 14 interposed between the cover 5 and the end portion 7. It is apparent from the drawing that the flange 14 is wider than the opening 18 in the cover 5. Therefore, the flange 14 cannot slip and cannot be pulled through the opening 18. Instead, when subjected to a pulling force in the direction of the threaded stud 8, the flange 14 is caused to bear against the cover 5. However, the rubber grommet 11 prevents direct contact between the flange 14 and the cover 5 inasmuch as it is provided with an integral guide plate 13 interposed between the flange 14 and the cover 5 so that the flange 14 remains spaced apart from the cover 5. Otherwise, the rubber grommet 11 is fitted onto the threaded stud 8 and is retained and secured against displacement thereon by an annular collar 2 integral with flange 14. The annular collar 2 is also capable of absorbing compressive forces transmitted by the engine mount. The rubber grommet 11 is provided with an annular groove 10 that is adapted for engagement with the edge of the opening 18 of the cover 5. Thus, the rubber grommet 11 is guided by the edge of the opening 18 of the cover 5 in a manner to allow parallel displacement of the rubber grommet in the plate of cover, and for this purpose the annular groove 10 is somewhat narrower than the width of the opening 18. In the area above the cover 5, i.e., below the annular collar 2, the rubber grommet 11 is slightly larger than the opening 18 and the annular collar 2. As a result, during assembly of the engine mount, the threaded stud 8 together with the annular collar 2 and the rubber grommet can be urged through the opening 18 of the cover 5 until the latter engages the guide plate 13. Since the rubber grommet 11 and thus the threaded stud 8 are displaceable in the opening 18 of the cover 5, the threaded stud 8 is adapted for movement at least perpendicularly to the axial center line 4.

Furthermore, the threaded stud is also adapted for tilting movement relative to the axial center line 4, because any one side of the thrust plate 13 can be compressed when the threaded stud 8 is tilted away from the axial center line 4.

The thrust plate 12 interposed between the flange 14 and the end portion 7 can also be compressed on any one side thereof. The thrust plate 12 which is made of rubber, provides that the flange 14 as well as the peripheral bead 15 are spaced apart at sufficient distance from the end portion 7. The peripheral bead 15 extends around the edge of the flange 14 and thereby prevents the thrust plate 12 from escaping from underneath the flange 14. The thrust plate 12 absorbs the compressive forces which are transmitted by the threaded bolt 8 and act against the end portion 7 whereas the guide plate 13 is adapted to absorb the traction forces directed against the cover 5 by the threaded stud 8. As a result, the threaded stud 8 is not only radially displaceable with respect to the axial center line 4, but is also adapted for tilting movement.

In the exemplary embodiment illustrated in the drawing, an annular bumper 3 made of rubber is arranged inside the sleeve 1. As a result, if abrupt lateral forces should occur, the flange 14 is able to engage the rubber bumper 3 with its peripheral bead 15 without causing any noise or wear problems. In order to provide displaceability and tiltability for the flange 14, the latter must be freely spaced apart from the rubber bumper 3 when in its center position, i.e., in its position of rest.

The embodiments of the invention in which an exclusive property or privilege is claimed are defined as follows:

1. A rubber-metal mounting for absorbing forces that act essentially in the direction of a center axis having an end portion, in the form of a metal plate on which is disposed a mounting assembly aid in the form of a threaded stud, characterized by displacement control means for allowing movement of the mounting assembly aid on the end portion out of the center axis without substantial distortion of the rubber-metal mounting, a cover disposed over the end portion essentially perpendicular to the center axis, the cover having an opening in which the mounting assembly aid is movable, a flange extending over the opening and disposed between the cover and the end portion, a rubber grommet disposed between the mounting assembly aid and the opening in the cover, a guide plate integral with the grommet located between the cover and the flange, a thrust plate made of rubber disposed between the flange and the end portion, and an axially extending edge bead on the flange encompassing the thrust plate and spaced apart by the latter from the end portion.

* * * * *